(No Model.) 2 Sheets—Sheet 1.

C. LEAVITT.
MECHANISM FOR UTILIZING WAVE POWER.

No. 321,229. Patented June 30, 1885.

WITNESS
E. W. Laird
J. R. Tibbitts

INVENTOR.
Charles Leavitt,
per Geo. W. Tibbitts atty (No Model.) 2 Sheets—Sheet 2.

C. LEAVITT.
MECHANISM FOR UTILIZING WAVE POWER.

No. 321,229. Patented June 30, 1885.

WITNESS.
Ew. Laird
G. P. Tibbitts.

INVENTOR.
Charles Leavitts.
per Geo. W. Tibbitts Atty.

UNITED STATES PATENT OFFICE.

CHARLES LEAVITT, OF CLEVELAND, OHIO.

MECHANISM FOR UTILIZING WAVE-POWER.

SPECIFICATION forming part of Letters Patent No. 321,229, dated June 30, 1885.

Application filed February 27, 1885. (No model.)

*To all whom it may concern:*

Be it known that I, CHARLES LEAVITT, of Cleveland, in the county of Cuyahoga and State of Ohio, have invented certain new and useful Improvements in Mechanism for Utilizing Wave-Power, of which the following is a specification.

This invention has for its object to employ the force of the waves on large bodies of water; and it consists of a float placed on the surface of the water, and inclosed within a suitable piling for protection to said float, and for supporting a superstructure for the employment of the power generated by the rise and fall of said float. The float is made to ride on a perpendicular rod, and is provided with a rack or racks, which mesh with and operate pinions or gears, from which power may be transmitted for pumping water or for air-compressing purposes.

Figure 2:
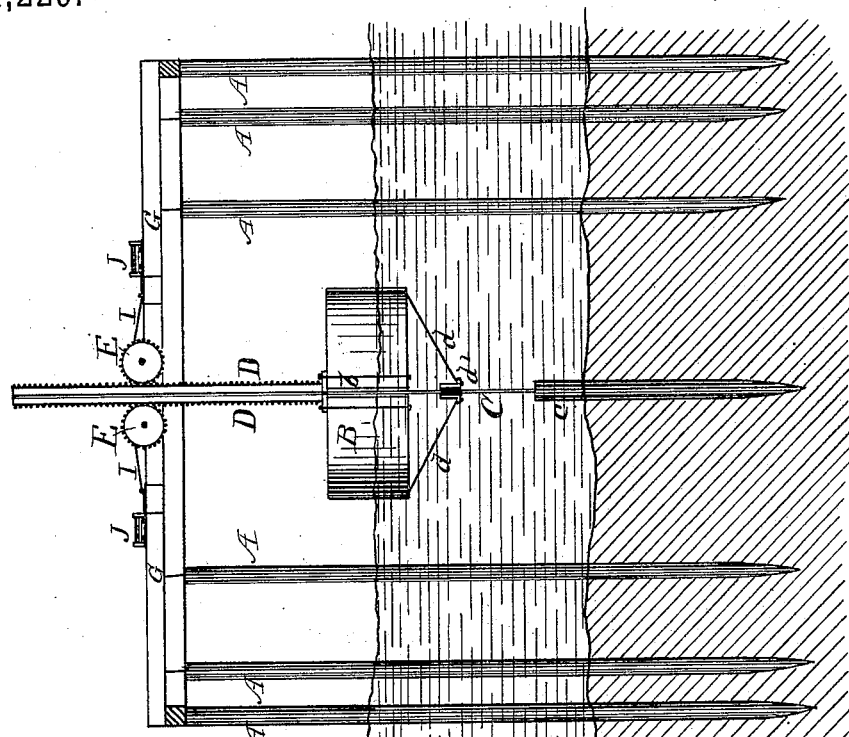
Figure 1:
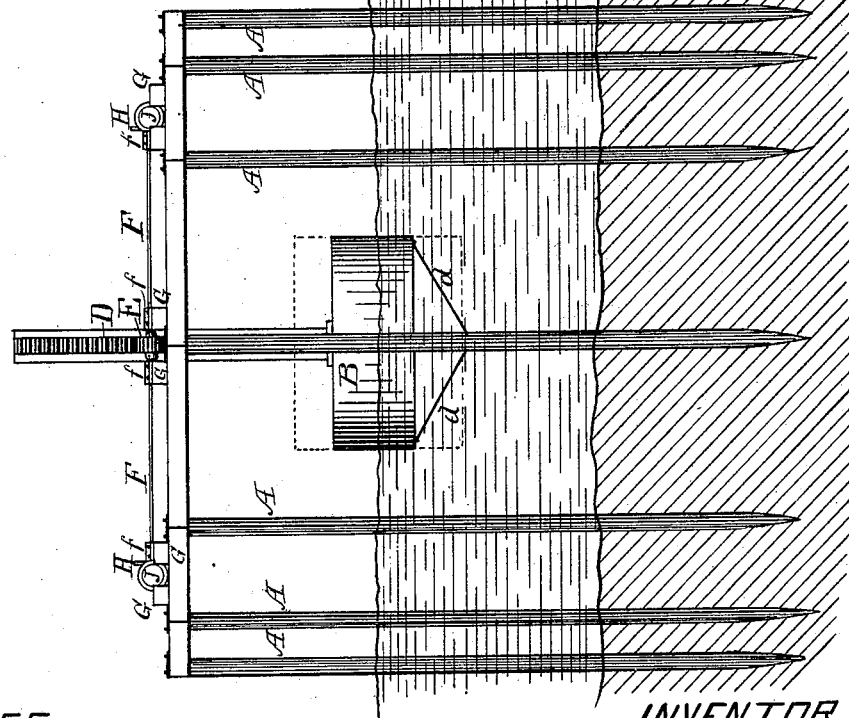
Figure 4:
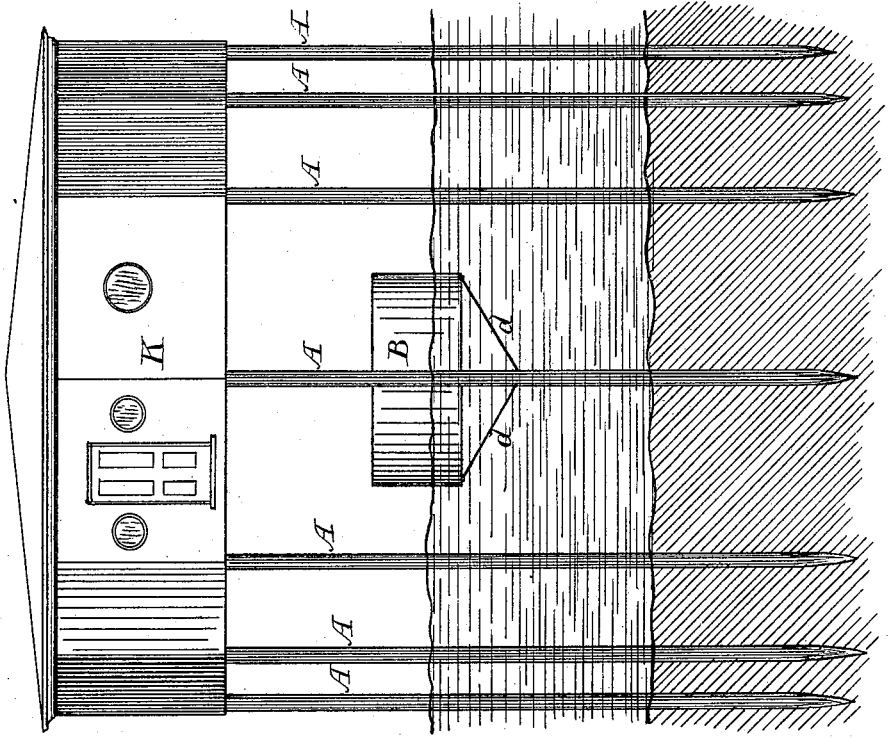
Figure 3:
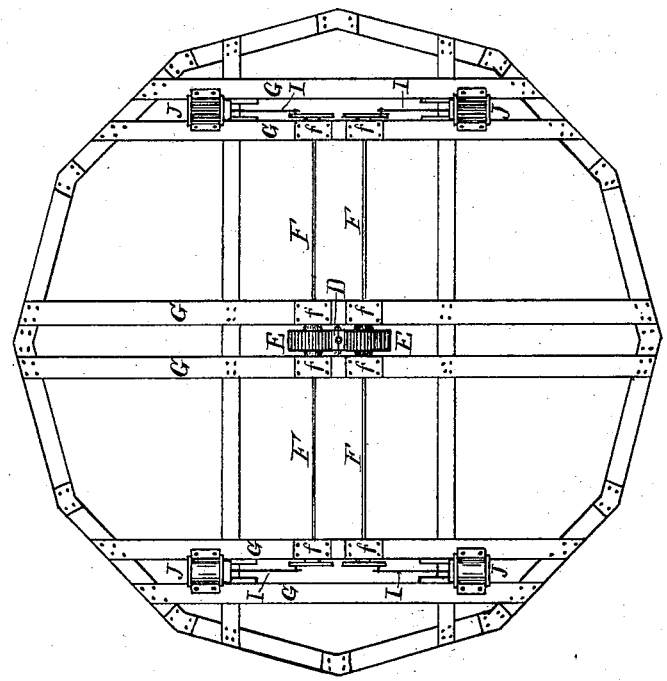

In the accompanying drawings, Figure 1 is a side elevation of my mechanism, showing the float surrounded by piling, which is represented as standing in the water and the earth under the water. Fig. 2 is a transverse section of the same. Fig. 3 is a plan view of the frame-work and floor supporting the machinery operated by the aforesaid float. Fig. 4 is a side elevation of the mechanism, like Fig. 1, showing a house supported on the said piling and covering the aforesaid machinery.

A A represent piling driven into the ground, under water of suitable depth, in circular form, and in sufficient numbers to form a convenient inclosure capable of withstanding the vehemence of great storms, and to provide a protection to the operating parts of the mechanism.

B is a float or buoy, made preferably of iron and in circular form. Said float is maintained in a central position within the said inclosure by means of a strong perpendicular rod or bar, C, secured near the bottom of the water by being anchored in a pile, $c$, firmly driven into the bed of the lake. Said rod extends upward through the floor and forms a guide for the movements of the float, which is provided with a central tube, $b$, through which the said rod passes. To the under side of said float are attached braces $d$ $d$, secured to a sleeve, $d'$, on the rod C, which rides thereon, together with the float, and which serve to prevent any tilting of the float and binding it, so as to impede its vertical movements.

D D are rack-bars secured to the upper side of the float B, which extend upward through the floor and mesh with and operate gears E E, attached to shafts F F, having their bearings in boxes $ff$, fixed on timbers G G, lying across the floor. Said shafts carry cranks H H, to which the pitmen I I of pumping-cylinder J J are attached. The rise and fall of the float operates through the medium of the racks to rotate the pinions or gears in both directions. The pitmen operate the same upon the pumps, however, whether the shafts rotate to the right or left.

K represents a house built upon the said floor, for covering the machinery and providing a suitable protection for same and the workmen or attendant, and is preferably made round, so as to resist the force of great windstorms.

From the foregoing it will be seen that the rise and fall of the float gives motion through the medium of the racks to the gears, thereby operating the pumps; and it will also be seen that said pumps work at short strokes or partial strokes as well as at full stroke, so that if the water is at all agitated to give rise and fall to the float, the pumps will be operated.

From the pump-cylinders are attached pipes, which may be united to one common main pipe, and leading to storage-tanks located in suitable position and at convenient distance from said pumping mechanism. In the instance of pumping water, force-pumps with air-chambers are to be used, and when the purpose is for air-compressing suitable air-pumps may be employed.

The great objects of my invention are to utilize the forces of the waves for operating pumps or other machinery, whereby great economy is the result, enabling the accumulation of water in reservoirs or the storage of compressed air to be accomplished at greatly-reduced expenditure of time, labor, and money.

I am aware that a float having racks attached for operating the mechanisms for pumping and the like have been used, the float, rising and falling on the waves, actuating such mechanism. I do not therefore claim, broadly, such mechanism, but the combination, with a float provided with racks, of the mechanism substantially as described in my specification and shown in my drawings.

Having described my invention, I claim—

In a mechanism for utilizing wave-power, the combination of the following elements, viz: the piling A, float or buoy B, riding on the upright rod C, supported centrally within the inclosure of piling, and provided with the racks D D, operating pinions or gears E E, attached to shafts F F, supported in boxes $f f$, resting on the timbers and frame-work G, and having cranks H, connected by pitmen I to pumping-cylinders J, all constructed and arranged to operate substantially as and for the purposes described.

CHARLES LEAVITT.

Witnesses:
E. W. LAIRD,
GEO. W. TIBBITTS.